US007555019B2

(12) United States Patent
Motomura

(10) Patent No.: US 7,555,019 B2
(45) Date of Patent: Jun. 30, 2009

(54) DIGITAL BROADCAST RECEIVING APPARATUS, DIGITAL BROADCAST APPARATUS, DIGITAL BROADCAST RECEIVING METHOD, DIGITAL BROADCAST METHOD, AND DIGITAL BROADCAST RECEIVING PROGRAM

(75) Inventor: Naohisa Motomura, Higashihiroshima (JP)

(73) Assignee: Panasonic Corporation, Osaka (JP)

( * ) Notice: Subject to any disclaimer, the term of this patent is extended or adjusted under 35 U.S.C. 154(b) by 806 days.

(21) Appl. No.: 10/780,726

(22) Filed: Feb. 19, 2004

(65) Prior Publication Data
US 2005/0105537 A1    May 19, 2005

(30) Foreign Application Priority Data
Feb. 20, 2003    (JP)    ............................. 2003-043173

(51) Int. Cl.
H04J 3/04    (2006.01)
(52) U.S. Cl. ........................ 370/535; 370/529; 370/532; 725/2; 725/50; 725/140; 725/142; 725/145; 725/152; 707/1; 707/200; 707/203
(58) Field of Classification Search ................. 370/529, 370/532, 535; 707/1, 200, 203
See application file for complete search history.

(56) References Cited

U.S. PATENT DOCUMENTS

| | | | | |
|---|---|---|---|---|
| 5,666,293 A | * | 9/1997 | Metz et al. ................... | 709/220 |
| 6,134,554 A | | 10/2000 | Freimann et al. | |
| 6,321,236 B1 | * | 11/2001 | Zollinger et al. ............ | 707/203 |
| 6,353,930 B1 | * | 3/2002 | Shimoji et al. .............. | 725/110 |
| 6,438,171 B1 | * | 8/2002 | Cartwright et al. ..... | 375/240.26 |
| 6,557,171 B1 | * | 4/2003 | Sonoda et al. .............. | 725/136 |
| 6,741,288 B1 | * | 5/2004 | Kessler ..................... | 348/385.1 |

(Continued)

FOREIGN PATENT DOCUMENTS

EP    0 921 681    6/1999

(Continued)

OTHER PUBLICATIONS

Digital Video Broadcasting (DVB); Specification for Service Information (SI) in DVB systems, ETSI EN 300 468 V1.3.1 (Feb. 1998).

(Continued)

*Primary Examiner*—Kwang B Yao
*Assistant Examiner*—Nguyen Ngo
(74) *Attorney, Agent, or Firm*—Wenderoth, Lind & Ponack, L.L.P.

(57) ABSTRACT

A digital broadcast system which, during the control of caching tables multiplexed into a transport stream, optimally updates the caching without wasting filter resources on changes such as updates to a higher version, addition, or disappearance of the tables.

A digital broadcast apparatus broadcasts a transport stream into which an available table information table (ATT) is multiplexed. The ATT monitoring unit in the receiving apparatus regularly monitors an update in the ATT and generates an available table information list every time the ATT has been updated to a higher version. The cache controlling unit compares the available table information list with a cache information list, assigns a filter resource and updates the cache of the table when there is a table updated to a higher version or added, and clears the cache of the table when there is a table that has disappeared.

6 Claims, 19 Drawing Sheets

U.S. PATENT DOCUMENTS

| | | | |
|---|---|---|---|
| 6,763,522 B1 * | 7/2004 | Kondo et al. | 725/39 |
| 6,986,159 B1 * | 1/2006 | Shimoji et al. | 725/142 |
| 2001/0052856 A1 | 12/2001 | Deniau et al. | |
| 2003/0041335 A1 * | 2/2003 | Patry et al. | 725/132 |
| 2003/0105847 A1 * | 6/2003 | Jennery et al. | 709/223 |
| 2003/0208760 A1 * | 11/2003 | Sugai et al. | 725/50 |
| 2004/0088739 A1 * | 5/2004 | Shimoji et al. | 725/135 |

FOREIGN PATENT DOCUMENTS

| | | |
|---|---|---|
| JP | 11-112897 | 4/1999 |
| WO | 99/20049 | 4/1999 |
| WO | 99/43158 | 8/1999 |
| WO | 00/27114 | 5/2000 |

OTHER PUBLICATIONS

Information technology—Generic coding of moving pictures and associated audio information: Systems, ISO/IEC 13818-1, Apr. 15, 1996, pp. 39-41.

Electronic Engineering, Aug. 2000, vol. 42, No. 9 with English Translation of Table 2.

Society of Cable Telecommunications Engineers, Standard Bulletin SCTE 65 2002, pp. 31-35, Fall 2002.

* cited by examiner

FIG.6

| CACHE INFORMATION LIST | | | | | | | | | | | |
|---|---|---|---|---|---|---|---|---|---|---|---|
| IDENTIFICATION INFORMATION | PAT | PMT(1) | PMT(2) | PMT(3) | NIT | SDT(1) | SDT(2) | SDT(3) | EIT(1) | EIT(2) | EIT(3) |
| VERSION NUMBER | 11 | 8 | 23 | 15 | 18 | 9 | 30 | 19 | 25 | 29 | 16 |
| EXIST/NON-EXIST FLAG | exist | exist | exist | exist | exist | exist | exist | exist | exist | exist | exist |
| VALIDITY PERIOD | -1 | -1 | -1 | -1 | -1 | -1 | -1 | -1 | -1 | -1 | -1 |

| AVAILABLE TABLE INFORMATION LIST 901 | | | | | | | | | | | | |
|---|---|---|---|---|---|---|---|---|---|---|---|---|
| IDENTIFICATION INFORMATION | PAT | PMT(1) | PMT(2) | PMT(3) | NIT | SDT(1) | SDT(2) | SDT(3) | SDT(4) | EIT(1) | EIT(2) | EIT(3) |
| VERSION NUMBER | 12 | 8 | 23 | 15 | 18 | 9 | 30 | 19 | 0 | 25 | 29 | 17 |
| EXIST/NON-EXIST FLAG | exist | exist | exist | non | exist | exist | exist | non | non | exist | exist | exist |
| VALIDITY PERIOD | -1 | -1 | -1 | t1 | -1 | -1 | -1 | t1 | -1 | -1 | -1 | -1 |

FIG.12

| ATT' | | | | | | | | | | | | |
|---|---|---|---|---|---|---|---|---|---|---|---|---|
| IDENTIFICATION INFORMATION | PAT | PMT(1) | PMT(2) | PMT(3) | NIT | SDT(1) | SDT(2) | SDT(3) | SDT(4) | EIT(1) | EIT(2) | EIT(3) |
| VERSION NUMBER | 12 | 8 | 23 | 15 | 18 | 9 | 30 | 19 | 0 | 25 | 29 | 17 |
| EXIST/NON-EXIST FLAG | exist | exist | exist | exist | exist | exist | exist | exist | non | exist | exist | exist |
| VALIDITY PERIOD | -1 | -1 | -1 | tx-tb | -1 | -1 | -1 | tx-tb | tc-ty | -1 | -1 | -1 |

| AVAILABLE TABLE INFORMATION LIST | 1401 | | | | | | | | | | |
|---|---|---|---|---|---|---|---|---|---|---|---|
| IDENTIFICATION INFORMATION | PAT | PMT(1) | PMT(2) | PMT(3) | NIT | SDT(1) | SDT(2) | SDT(3) | EIT(1) | EIT(2) | EIT(3) |
| VERSION NUMBER | 12 | 8 | 23 | 15 | 18 | 9 | 30 | 19 | 25 | 29 | 17 |
| EXIST/NON-EXIST FLAG | exist | exist | exist | exist | exist | exist | exist | exist | exist | exist | exist |
| VALIDITY PERIOD | -1 | -1 | -1 | tx-tb | -1 | -1 | -1 | tx-tb | -1 | -1 | -1 |

FIG.15

VALIDITY PERIOD INFORMATION LIST
1501

| IDENTIFICATION INFORMATION | PMT(3) | SDT(3) | SDT(4) |
|---|---|---|---|
| VERSION NUMBER | 15 | 19 | 0 |
| EXIST/NON-EXIST FLAG | exist | exist | non |
| VALIDITY PERIOD | tx-tb | tx-tb | tc-ty |

FIG.17

CACHE SCHEDULE LIST

| TIME | EVENT | IDENTIFICATION INFORMATION |
|---|---|---|
| tc | APPEARANCE EVENT | SDT(4) |
| tb | DISAPPEARANCE EVENT | PMT(3) |
| tb | DISAPPEARANCE EVENT | SDT(3) |

DIGITAL BROADCAST RECEIVING APPARATUS, DIGITAL BROADCAST APPARATUS, DIGITAL BROADCAST RECEIVING METHOD, DIGITAL BROADCAST METHOD, AND DIGITAL BROADCAST RECEIVING PROGRAM

BACKGROUND OF THE INVENTION

1. Field of the Invention

The present invention relates to digital broadcast receiving apparatuses and digital broadcast apparatuses for receiving and transmitting transport streams onto which video data and/or audio data are multiplexed.

2. Description of the Related Art

In addition to broadcast programs constituted by video data and audio data, data programs are also broadcasted through digital TV broadcast systems. These programs are broadcasted by being multiplexed onto transport streams. Various kinds of information are concurrently multiplexed onto a transport stream and broadcasted so that these programs can be received by a receiving apparatus. These pieces of information are repeatedly broadcasted as tables in a section format. The examples are written in ETSI EN 300 468 (page 12, FIG. 2).

For example, in the DVB (Digital Video Broadcasting) standard, which is prominent as a digital broadcast system used in Europe, various tables are broadcast, such as a PAT (Program Association Table), a PMT (Program Map Table), and a CAT (Conditional Access Table) which are defined according to the MPEG2 (Moving Picture Experts Group 2) standard as PSI (Program Specific Information) (cf. ISO/IEC 13818-1, page 41, Chapter 2.4.4.), as well as an NIT (Network Information Table), an SDT (Service Description Table), an EIT (Event Information Table), a TOT (Time Offset Table), and a TDT (Time and Date Table), each of which are defined as SI (Service Information) (cf. ISO/IEC 13818-1, page 41, Table 2-25), and so on.

These tables are separated and extracted from transport streams and are stored into a memory so that they can be used for tuning of programs, switching between audio and video, displaying EPGs, and the like.

The technique for separating and extracting these tables is disclosed in, for example, the Japanese Unexamined Patent Application Publication No. 11-112897. A plurality of filters are used in such separation and extraction. The examples are cited, for example, in "*Denshi Gijutsu*" (Vol. 42, No. 9, page 24, Table 2 (2000)).

As the broadcast of a program proceeds, these tables are updated. A version number is attached to each table. The version number of a table being separated and extracted is compared with the version number of the table stored in a memory. When the version numbers are the same, the table will be discarded. When it is found that the table has been updated, what is stored in the memory will be updated. Thus, it is necessary to have a large number of filters available in order to regularly separate and extract tables.

In addition, when a table becomes unnecessary and stops being multiplexed onto transport streams and being broadcast, the unnecessary table will be stored in the memory permanently, and fills up the memory in vain, because it is not possible to separate and extract that table using the filter assigned for separation and extraction of the table.

BRIEF SUMMARY OF THE INVENTION

An object of the present invention is to provide a digital broadcast receiving apparatus and a digital broadcast apparatus that do not overuse filters, which are hardware resources, and are able to utilize a memory efficiently.

It is possible to achieve the object with a digital broadcast receiving apparatus that receives a transport stream into which video data and/or audio data are multiplexed and outputs video data and/or audio data, comprising: a first extracting unit that has a packet filter and a section filter and is operable to extract one or more of tables, each of which (i) is repeatedly multiplexed onto the transport stream, (ii) is contained in a transport stream packet in a section format, (iii) is identified with a packet identifier and a table identifier, and (iv) includes information for extracting and outputting the video data and/or the audio data; a storing unit operable to store therein the extracted tables; and a second extracting unit operable to extract an information table that is repeatedly multiplexed onto the transport stream and includes (i) a piece of table ID information and a table version number of each of the tables and (ii) an information table version number of the information table, which is to be updated when there is a change in any one of the pieces of table ID information and the table version numbers, the extraction being performed when the information table version number has been updated. Further, the apparatus includes a controlling unit operable to analyze the extracted information table, have the first extracting unit extract, based on table ID information, such a table whose table version number has been updated, and have the storing unit update what is stored therein. The controlling unit includes: an information list generating subunit operable to generate an information list that includes such information of the tables stored in the storing unit that corresponds to the information table; a comparing subunit operable to compare table version numbers written in the information list with the table version numbers in the information table extracted by the second extracting unit; and a filter condition setting subunit operable to set a packet identifier and a table identifier of such a table whose table version number written in the information table is found updated by the comparing subunit, as a packet filter and a section filter, respectively.

With this arrangement, it is possible to find out that the version number of the information table has been updated. It is no longer necessary to have the first extracting unit available in order to be able to extract the tables at anytime to monitor if they have been updated to a higher version. Further, by providing a set of a packet filter and a section filter, it is possible to extract the table that has been updated. Thus, it is possible to save filter resources with certainty.

It is also acceptable to have an arrangement wherein the pieces of table ID information written in the information table are the packet identifiers and the table identifiers of the tables.

With this arrangement, it is possible to easily set filter conditions on the packet filter and the section filter by only analyzing what is in the ATT.

It is further acceptable to have an arrangement wherein extraction conditions at the packet filter and the section filter of the first extracting unit are set by the filter condition setting subunit, and when the first extracting unit extracts a table, and the storing unit stores therein this table having an old table version number attached, the first extracting unit overwrites the table having the old table version number with the extracted table.

With this arrangement, when any of the tables stored in the storing unit has been updated, it is possible to have the storing unit store data without wasting the storage area.

Further, it is acceptable to have an arrangement wherein the information table further includes a flag that indicates whether each of the tables is being multiplexed onto the transport stream or not, and the controlling unit further includes a deleting subunit operable to delete, from the storing unit and the information list, such a table that is indicated by the flag as not being multiplexed.

With this arrangement, it is possible to omit, from the storing unit, such a table that has become unnecessary.

Furthermore, it is acceptable to have an arrangement wherein the information table further includes a validity period of each of the tables, and the controlling unit further includes: a schedule generating subunit operable to generate a schedule for extracting a table at a beginning of its validity period and for deleting a table at an end of its validity period; and the filter condition setting subunit and the deletion subunit operate according to the schedule.

With this arrangement, it is possible to reduce the frequency of updating the information table.

It is possible to achieve the object also with a digital broadcast apparatus comprising: a first multiplexing unit operable to multiplex video data and/or audio data into a transport stream; a second multiplexing unit operable to repeatedly multiplex tables into the transport stream in a section format, the tables each including information used for extraction and output of video data and/or audio data performed by a receiving apparatus and being identified by a packet identifier and a table identifier; a third multiplexing unit operable to repeatedly multiplex, into the transport stream, an information table that includes (i) a piece of table ID information and a table version number of each of the tables and (ii) an information table version number of the information table, which is to be updated when any one of the tables is updated; and a transmitting unit operable to transmit the transport stream, on which the first, second, and third multiplexing units have performed the multiplexing, to the receiving apparatus.

With this arrangement, it is possible to save the filter resources in the digital broadcast receiving apparatus that receives transmission from the digital broadcast apparatus.

It is possible to achieve the object also with a digital broadcast receiving method for receiving a transport stream onto which video data and/or audio data are multiplexed and outputting video data and/or audio data, comprising: a first extracting step of, with use of a packet filter and a section filter, extracting one or more of tables, each of which (i) is repeatedly multiplexed into the transport stream, (ii) is contained in a transport stream packet in a section format, (iii) is identified with a packet identifier and a table identifier, and (iv) includes information for extracting and outputting the video data and/or the audio data; a recording step of recording the extracted tables in a storage area; a second extracting step of extracting an information table that is repeatedly multiplexed into the transport stream and includes (i) a piece of table ID information and a table version number of each of the tables and (ii) an information table version number of the information table, which is to be updated when there is a change in any one of the pieces of table ID information and the table version numbers, the extraction being performed when the information table version number has been updated; and a controlling step of analyzing the extracted information table, having the first extracting step extract, based on table ID information, such a table whose table version number has been updated, and having what has been recorded in the recording step updated, wherein the controlling step includes: an information list generating substep of generating an information list that includes such information of the tables recorded in the recording step that corresponds to the information table; a comparing substep of comparing table version numbers written in the information list with the table version numbers in the information table extracted in the second extracting step; and a filter condition setting step of setting a packet identifier and a table identifier of such a table whose table version number written in the information table is found updated by the comparing substep, as a packet filter and a section filter, respectively.

With the use of this method, it is possible to find out that the version number of the information table has been updated. It is no longer necessary to have the first extracting unit available in order to be able to extract the tables at anytime to monitor if they have been updated to a higher version. Further, by providing a set of a packet filter and a section filter, it is possible to extract the table that has been updated. Thus, it is possible to save filter resources with certainty.

It is further possible to achieve the object with a digital broadcast method comprising: a first multiplexing step of multiplexing video data and/or audio data into a transport stream; a second multiplexing step of repeatedly multiplexing tables into the transport stream in a section format, the tables each including information used for extraction and output of video data and/or audio data performed by a receiving apparatus and being identified by a packet identifier and a table identifier; a third multiplexing step of repeatedly multiplexing, onto the transport stream, an information table that includes (i) a piece of table ID information and a table version number of each of the tables and (ii) an information table version number of the information table, which is to be updated when any one of the tables is updated; and a transmitting step of transmitting the transport stream, on which the first, second, and third multiplexing steps have performed the multiplexing, to the receiving apparatus.

With the use of this method, it is possible to save the filter resources in the digital broadcast receiving apparatus that receives transmission from the digital broadcast apparatus.

Additionally, it is possible to achieve the object with a digital broadcast receiving program to be applied to a digital broadcast receiving apparatus that receives a transport stream into which video data and/or audio data are multiplexed and outputs video data and/or audio data, comprising: a first extracting step of, with use of a packet filter and a section filter, extracting one or more of tables, each of which (i) is repeatedly multiplexed into the transport stream, (ii) is contained in a transport stream packet in a section format, (iii) is identified with a packet identifier and a table identifier, and (iv) includes information for extracting and outputting the video data and/or the audio data; a recording step of recording the extracted tables in a storage area; a second extracting step of extracting an information table that is repeatedly multiplexed into the transport stream and includes (i) a piece of table ID information and a table version number of each of the tables and (ii) an information table version number of the information table, which is to be updated when there is a change in any one of the pieces of table ID information and the table version numbers, the extraction being performed when the information table version number has been updated; and a controlling step of analyzing the extracted information table, having the first extracting step extract, based on table ID information, such a table whose table version number has been updated, and having what has been recorded in the recording step updated. The controlling step includes: an information list generating substep of generating an information list that includes such information of the tables recorded in the recording step that corresponds to the information table; a comparing substep of comparing table version numbers written in the information list with the table version numbers in the information table extracted in the second extracting step; and a filter condition setting step of setting a packet identifier and a table identifier of such a table whose table version number written in the information table is found updated by the comparing substep, as a packet filter and a section filter, respectively.

By applying such a digital broadcast receiving program to a digital broadcast receiving apparatus, it is possible to prevent overuse of filters, which are hardware resources.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 6 shows an example of the cache information list generated by the cache controlling unit in the first embodiment;

FIG. 9 is an example of an available table information list generated by the ATT monitoring unit of the first embodiment;

FIG. 12 shows an example of what is in the ATT' that is obtained by the ATT monitoring unit immediately after the time "ta" and has been updated, in the second embodiment;

FIG. 14 is an available table information list generated by the ATT monitoring unit immediately after the time "ta", in the second embodiment;

FIG. 15 is a validity period information list generated by the ATT monitoring unit immediately after the time "ta", in the second embodiment;

FIG. 17 shows an example of the cache schedule list generated by the cache schedule managing unit in the second embodiment;

DETAILED DESCRIPTION OF THE INVENTION

The following describes embodiments of the digital broadcast receiving apparatus and the digital broadcast apparatus of the present invention, with reference to the drawings.

First Embodiment

Figure 1:
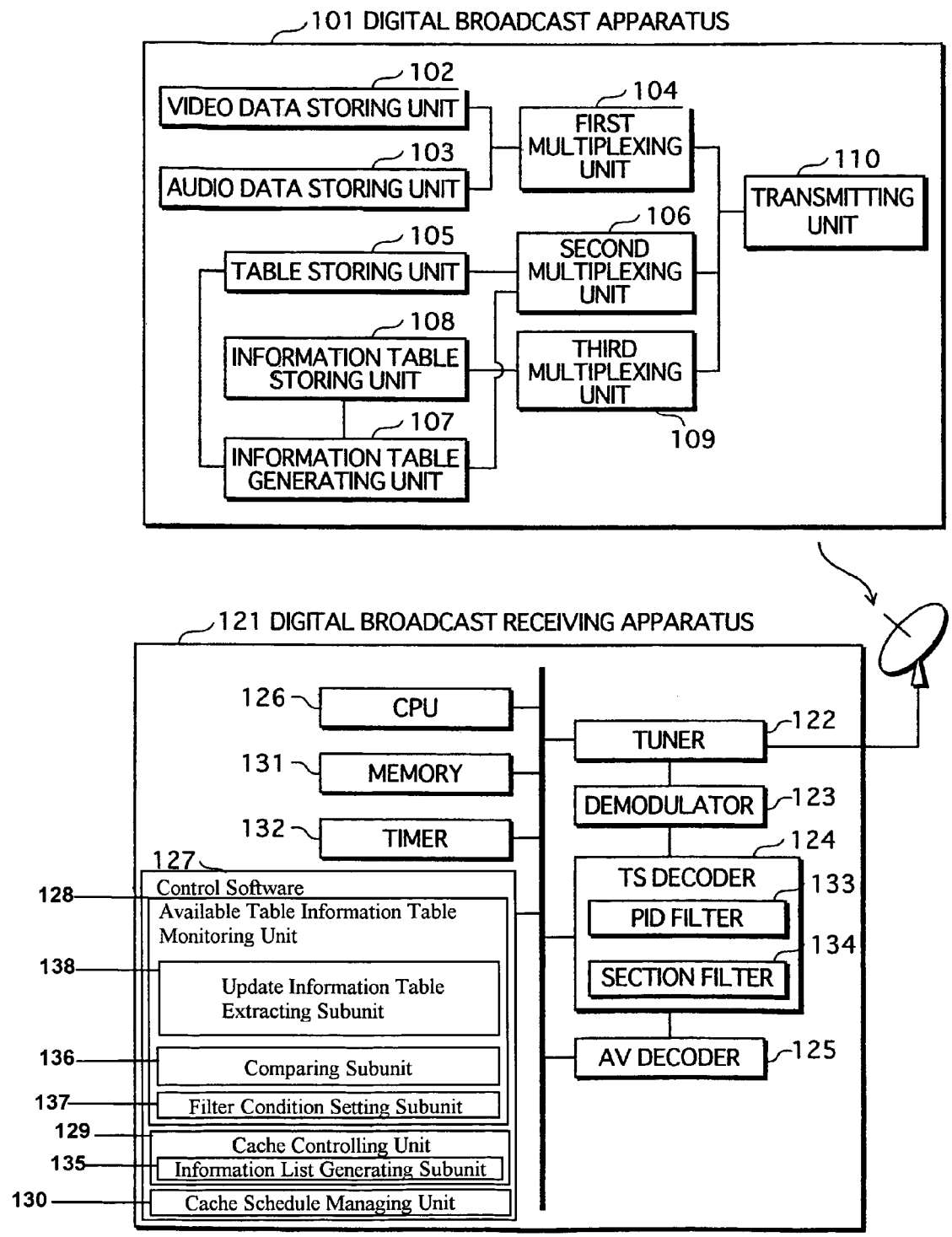
FIG. 1 shows the structure of the digital broadcast apparatus and the digital broadcast receiving apparatus in a first embodiment of the present invention.

FIG. 1 shows the structure of the digital broadcast apparatus and the digital broadcast receiving apparatus in an embodiment of the present invention.

The digital broadcast apparatus 101 comprises the video data storing unit 102, the audio data storing unit 103, the first multiplexing unit 104, the table storing unit 105, the second multiplexing unit 106, the information table generating unit 107, the information table storing unit 108, the third multiplexing unit 109, and the transmitting unit 110.

The digital broadcast receiving apparatus 121 comprises the tuner 122, the demodulator 123, the TS decoder 124, the AV decoder 125, the CPU 126, as well as the available table information table (ATT) monitoring unit 128 and the cache controlling unit 129 to be realized by the control software 127, and also the memory 131. The ATT monitoring unit includes an update information table extracting subunit 138, a comparing subunit 136, and a filter condition setting subunit 137. Further, the cache controlling unit includes an information list generating subunit 135. The TS decoder 124 includes the PID filter 133 and the section filter 134.

Firstly, explanation will be provided on the digital broadcast apparatus 101.

The video data storing unit 102 stores therein video data that constitutes a broadcast program in an elementary stream format. The audio data storing unit 103 stores therein audio data that constitutes a broadcast program in an elementary stream format. The first multiplexing unit 104 assembles the video data stored in the video data storing unit 102 and the audio data stored in the audio data storing unit 103 into transport stream packets, respectively, multiplexes them, and outputs them to the transmitting unit 110.

The table storing unit 105 stores therein tables in a section format. Examples of the tables include PATs and PMTs, which are defined as PSI according to the MPEG2 standard, and NITs, SDTs, and EITs which are defined as SI.

The second multiplexing unit 106 reads such tables and assembles them into transport stream packets, repeatedly multiplexes them, and outputs them to the transmitting unit 110.

The information table generating unit 107 generates an Available Table information Table (hereafter, referred to as an ATT) which makes it possible to judge whether the tables outputted from the second multiplexing unit 106 are updated or not.

Figure 2:
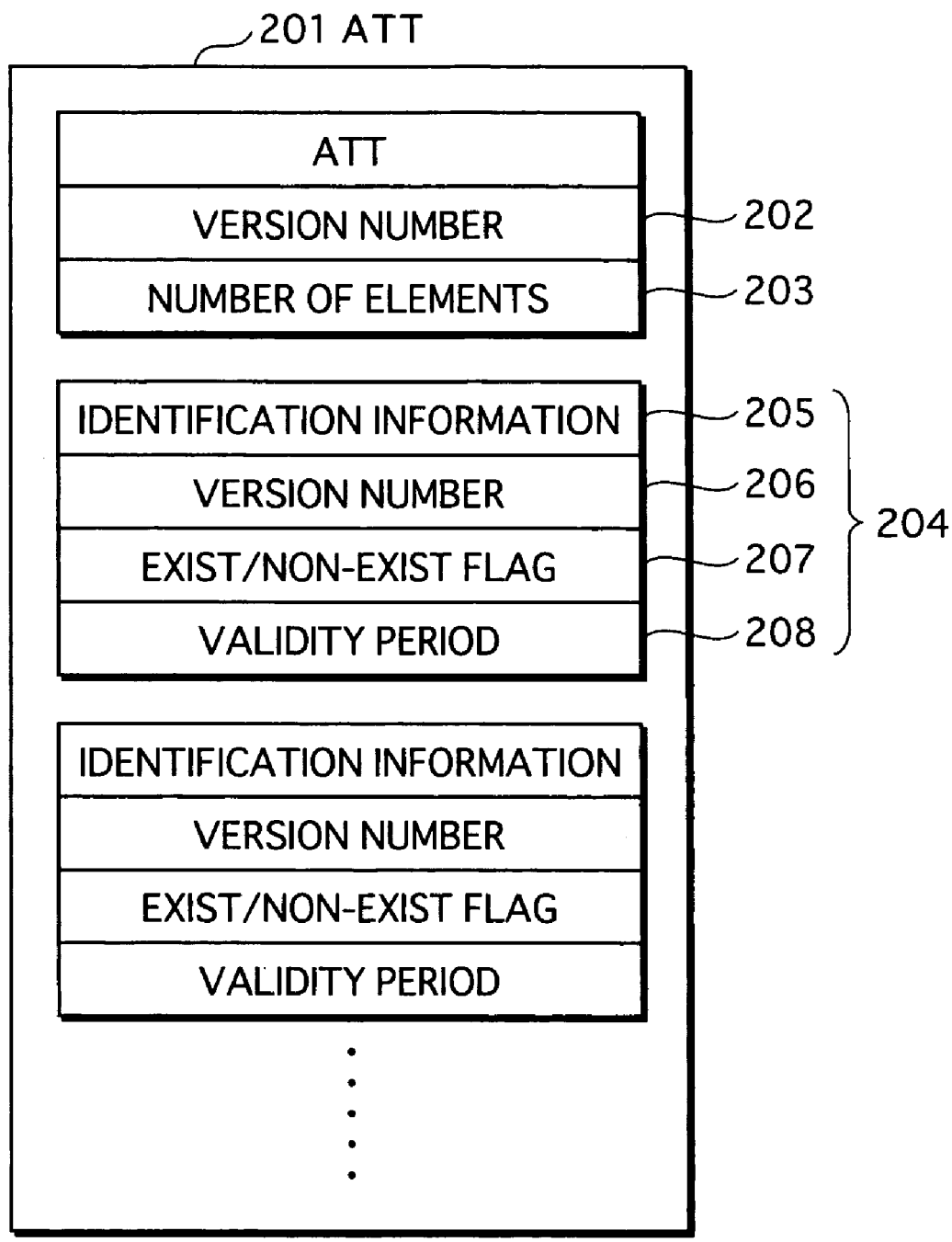
FIG. 2 shows an example of the data structure of an available table information table generated by the information table generating unit of the digital broadcast apparatus in the first embodiment.

FIG. 2 shows an example of the data structure of an ATT.

The ATT 201 includes information such as the version number 202 of the ATT itself, the number of elements 203, which is the total number of the tables included in this ATT, and the information of the tables 204. The version number 202 becomes a number updated to a higher version, when the information of the tables 204 is updated.

Each piece of information of the tables 204 includes identification information 205, a version number 206, an exist/non-exist flag 207, and a validity period 208.

The identification information 205 may be indicated as a table name, or alternatively, it may be indicated as a packet identifier (PID) of a packet into which the table is to be assembled and a table identifier (table_id).

The version number 206 is updated when the table is updated.

When a table stored in the table storing unit 105 is being multiplexed onto a transport stream by the second multiplexing unit 106, the exist/non-exist flag 207 indicates "exist", and when the multiplexing is stopped or has not yet started, the exist/non-exist flag 207 indicates "non".

The validity period 208 is to be multiplexed onto a transport stream and shows a beginning time and an ending time of the broadcast. When the value of the validity period 208 is "−1", for example, it is an invalid value and it means that there is no validity period.

The information table generating unit 107 extracts identification information 205, a version number 206, and a validity period 208 of each of the tables stored in the table storing unit 105, and sets the exist/non-exist flag 207 of those tables being multiplexed by the second multiplexing unit 106 as "exist". As additional information, in a case where the identification information 205 is indicated as a PID and a table_id, when the second multiplexing unit 106 has determined the table_id, the table_id will be extracted.

The information table storing unit 108 stores therein the ATT 201 generated by the information table generating unit 107.

The third multiplexing unit 109 reads the ATT 201 from the information table storing unit 108, repeatedly multiplexes it onto a transport stream to be outputted to the transmitting unit 110.

The transmitting unit 110 transmits the transport streams outputted from the first multiplexing unit 104, the second multiplexing unit 106, and the third multiplexing unit 109 to the digital broadcast receiving apparatus 121.

Figure 3:
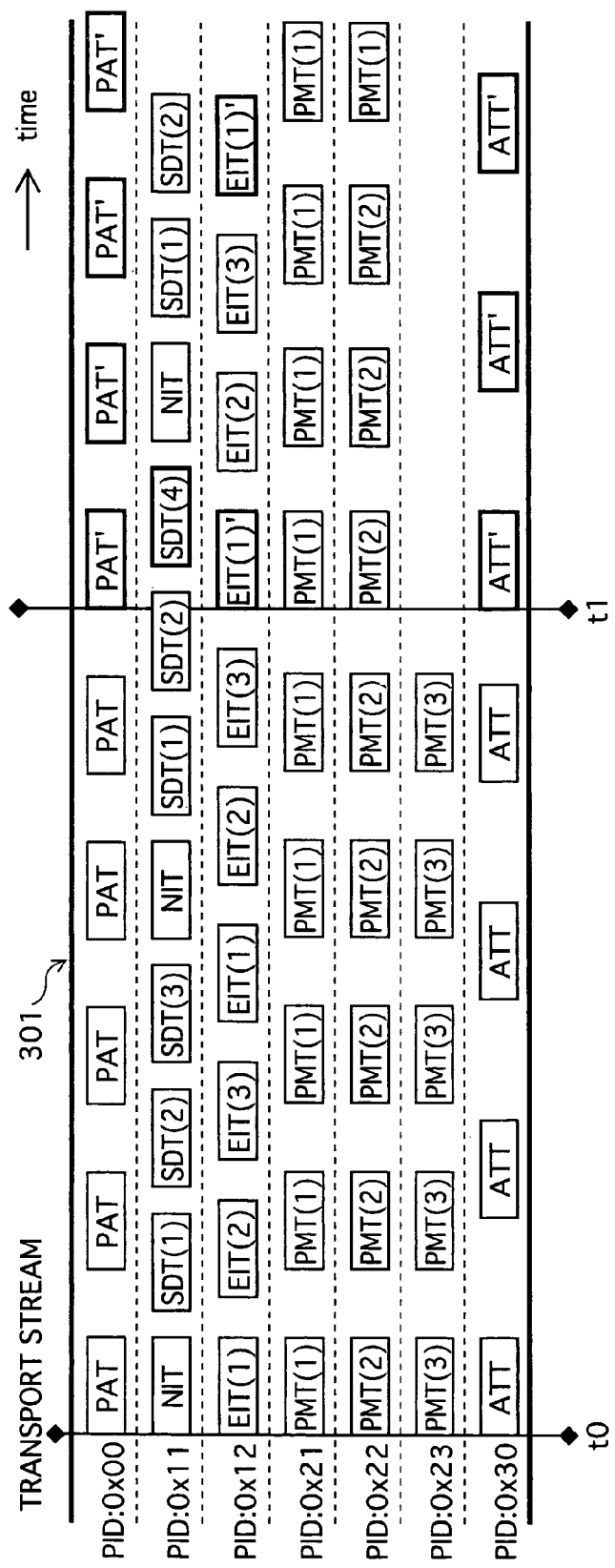
FIG. 3 is a schematic drawing of a transport stream into which tables are multiplexed and which is transmitted from the digital broadcast apparatus of the first embodiment.

FIG. 3 is a schematic drawing of transport stream packets outputted from the second multiplexing unit 106 and the third multiplexing unit 109 in the transport stream transport stream transmitted from the transmitting unit 110. It should be noted that, although there are more tables other than the ones shown here, they are omitted from the drawing.

The further to the right a position is located in the transport stream 301, the longer the time lapse is to that position. The PIDs written on the left side of FIG. 3 are identifiers of the transport stream packets into which the tables are assembled.

At the time "t1", the tables "PAT" and "EIT(1)" change to updated tables "PAT'" and "EIT(1)'", respectively, and also the tables "SDT(3)" and "PMT(3)" each stop being transmitted, where as the table "SDT(4)" newly starts being transmitted. Accordingly, the table "ATT" changes to the table "ATT'", which has an updated version number.

The digital broadcast apparatus 101 broadcasts the transport stream onto which video data and audio data have been multiplexed by the first multiplexing unit 104, along with the transport stream shown in FIG. 3.

The following describes the digital broadcast receiving apparatus 121.

Under the control of the CPU 126, the tuner 122 receives RF (radio frequency) signals broadcasted from the digital broadcast apparatus 101 via an antenna.

The demodulator 123 digitalizes the RF signals received by the tuner 122 into a transport stream, so as to output it to the TS decoder 124 (first extracting unit).

The TS decoder 124 separates and extracts, from the transport stream outputted from the demodulator 123, transport stream packets with the filter conditions set at the PID filter 133. The TS decoder outputs the video data and the audio data to the AV decoder 125.

After the tables are separated and extracted with the filter conditions set at the PID filter 133, they are further separated and extracted with the section filter 134. It should be noted that the filter conditions at this time are set by the cache controlling unit 129, which is realized by the control software 127 to be mentioned later.

The tables separated and extracted are stored into the memory 131 under the control of the cache controlling unit 129.

The AV decoder 125 decodes the transport stream packets of video data and audio data that have been inputted from the TS decoder 124 so that they are outputted from a monitor and a speaker, or the like, as video and audio.

The CPU 126 controls the units comprised in the digital broadcast receiving apparatus 121 with the use of the control software. It should be noted that an explanation is omitted as to the control for outputting the video data and audio data of broadcast programs in response to an instruction received from a user who uses the digital broadcast receiving apparatus 121, since it is not the main gist of the present invention.

The control software 127 controls the separation and extraction of the tables that are multiplexed onto the transport stream transmitted from the digital broadcast apparatus 101. The control software 127 realizes the ATT monitoring unit 128 (second extracting unit) and the cache controlling unit 129 through the operation of the CPU 126.

Figure 4:
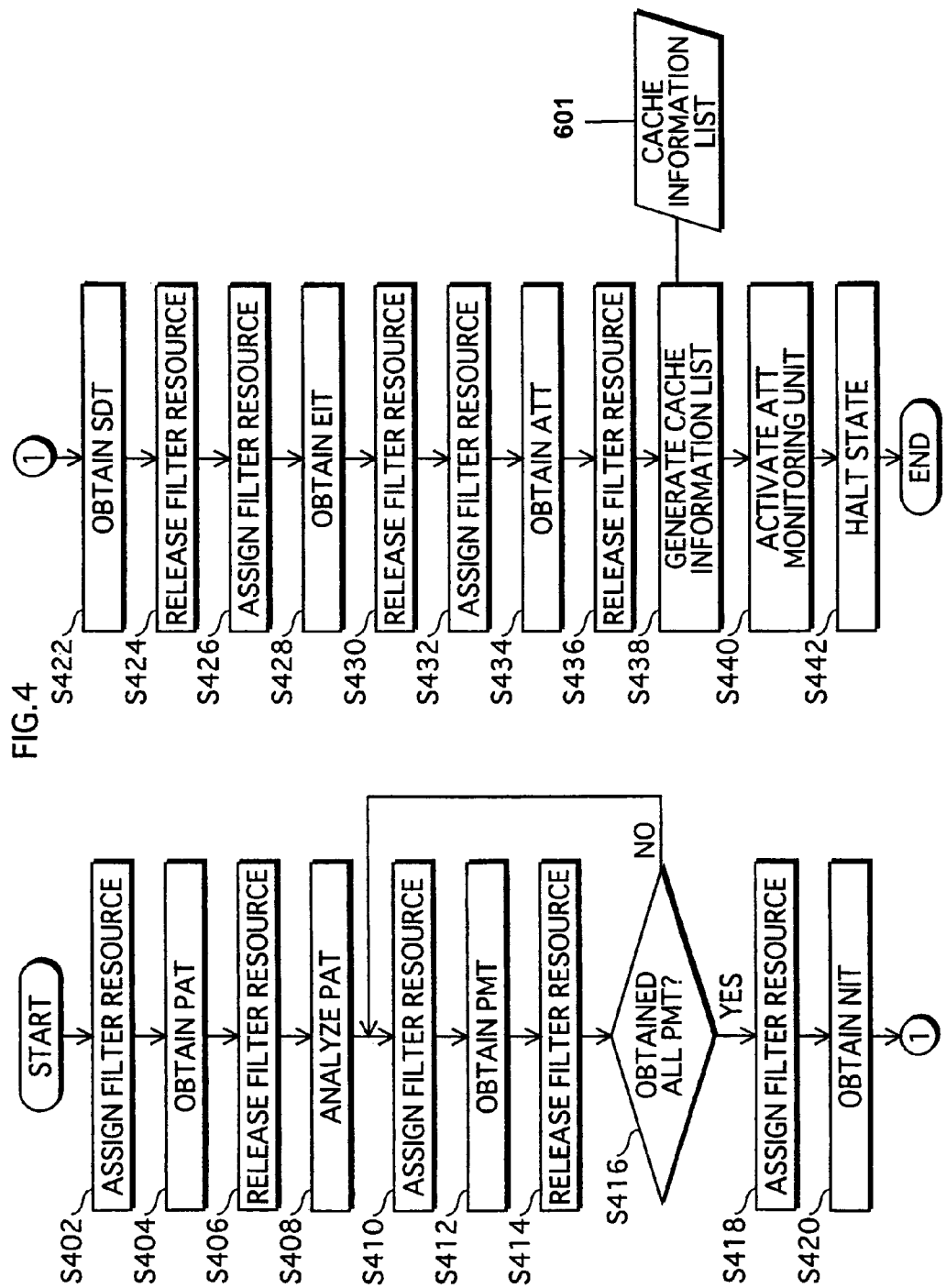
FIG. 4 is a flow chart that describes the initial operation of the cache controlling unit in the digital broadcast receiving apparatus of the first embodiment.

Now, when the transport stream 301 shown in FIG. 3 is transmitted from the digital broadcast apparatus and the power of the digital broadcast receiving apparatus is turned on at the time "t0", the cache controlling unit 129 performs the operation shown in the flow chart in FIG. 4.

First, a task in the cache controlling unit 129 is activated. Under the operation of the CPU 126, the PID "0x00" assigned to the PAT is set at the PID filter 133, and the value of the table_id is set at the section filter 134 (S402). After the PAT multiplexed onto the transport stream 301 is obtained, the PAT is stored into the memory 131 (S404). The values set at the PID filter 133 and the section filter 134 are deleted so that the filter resource is released (S406).

The cache controlling unit 129 analyzes what is in the PAT obtained, and obtains the PIDs and the table_ids of PMTs (S408). A PID and a table_id of each PMT are set at the PID filter 133 and the section filter 134, respectively (S410). Each PMT is extracted and stored into the memory 131 (S412), so that the filter resource is released (S414). It is judged whether all the PMTs identified with the PIDs and table_ids obtained from the PAT have been obtained or not (S416), and when it is judged in the negative, the procedure returns to S410. Through this process, PMT(1), PMT(2), and PMT(3) will be obtained from the transport stream 301.

Next, in order to extract the NIT multiplexed onto the transport stream 301, the cache controlling unit 129 sets the PID value "0x11" and the value of the table_id of the NIT at the PID filter 133 and the section filter 134, respectively (S418). After the NIT is obtained and stored into the memory 131, the values of the table_ids of the SDTs are set at the section filter 134 sequentially, so that each of the SDTs is obtained and stored into the memory 131 (S422). Through this process, the NIT, SDT(1), SDT(2), SDT(3) are obtained.

The cache controlling unit 129 releases the filter resource (S424), and sets the PID "0x12" assigned to the EITs at the PID filter 133, and sets the values of the table_ids at the section filter 134 sequentially (S426), so that each of the EITs is obtained and stored into the memory 131 (S428). Through this process, EIT(1), EIT(2), and EIT(3) that are multiplexed into the transport stream 301 are obtained.

The cache controlling unit 129 sets the PID "0x30" assigned to the ATT at the PID filter 133, and sets the value of the table_id at the section filter 134 (S432), so that the ATT is obtained from the transport stream 301 and stored into the memory 131 (S434).

Figure 5:
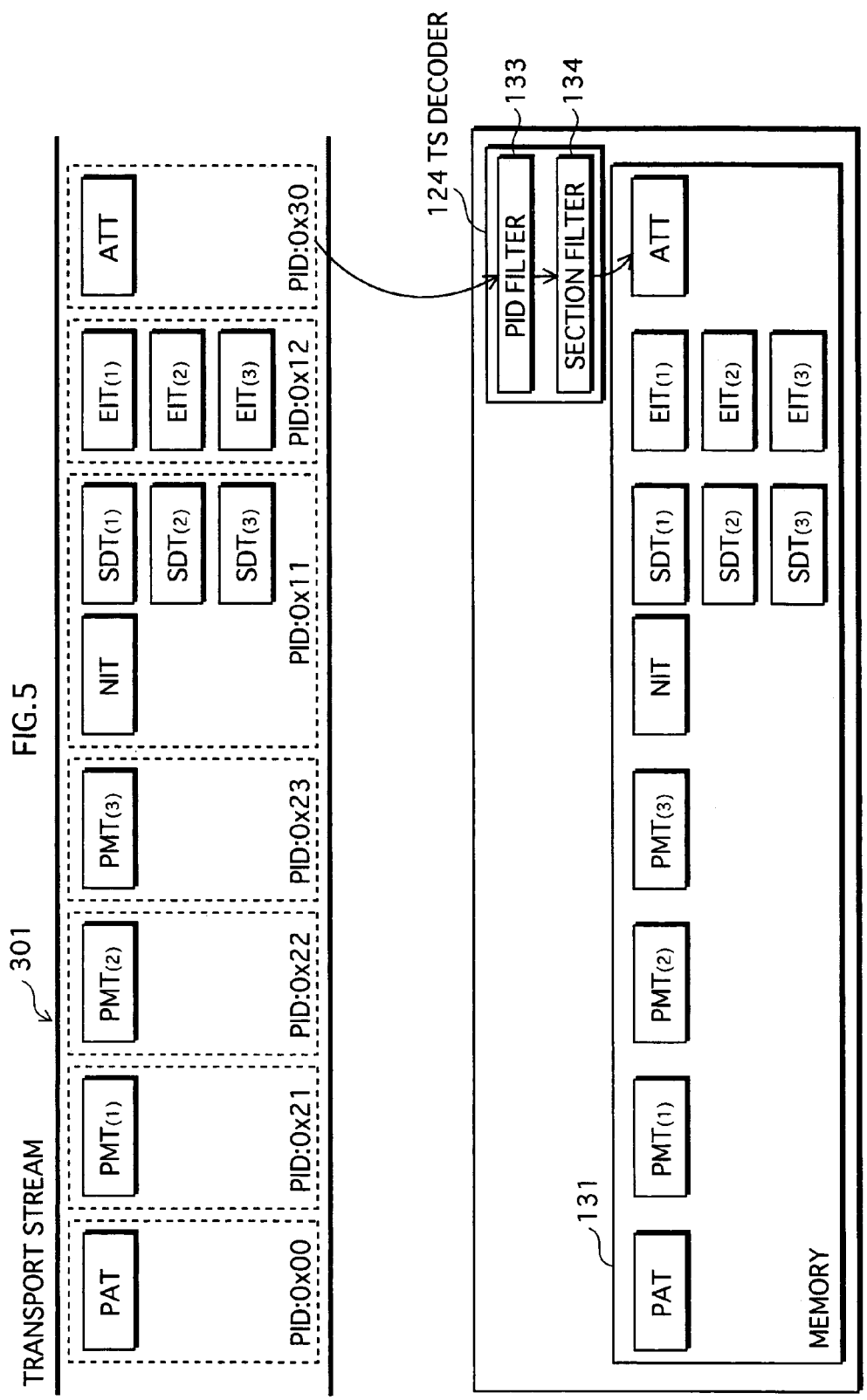
FIG. 5 is a schematic drawing showing how the tables are separated and extracted from a transport stream with use of the TS decoder, in the first embodiment.

FIG. 5 is a schematic drawing showing how the tables, such as the PAT, are obtained from the transport stream 301.

The controlling unit 129 releases the filter resource (S436), and generates a cache information list (S438).

FIG. 6 shows the cache information list that has been generated. The cache information list 601 shows information that is of the tables that are stored in the memory 131 and corresponds to the information of the tables 204 included in the ATT 201.

The cache controlling unit 129 activates a task of the ATT monitoring unit 128 (S440), and enters the halt state (S442).

Figure 7:
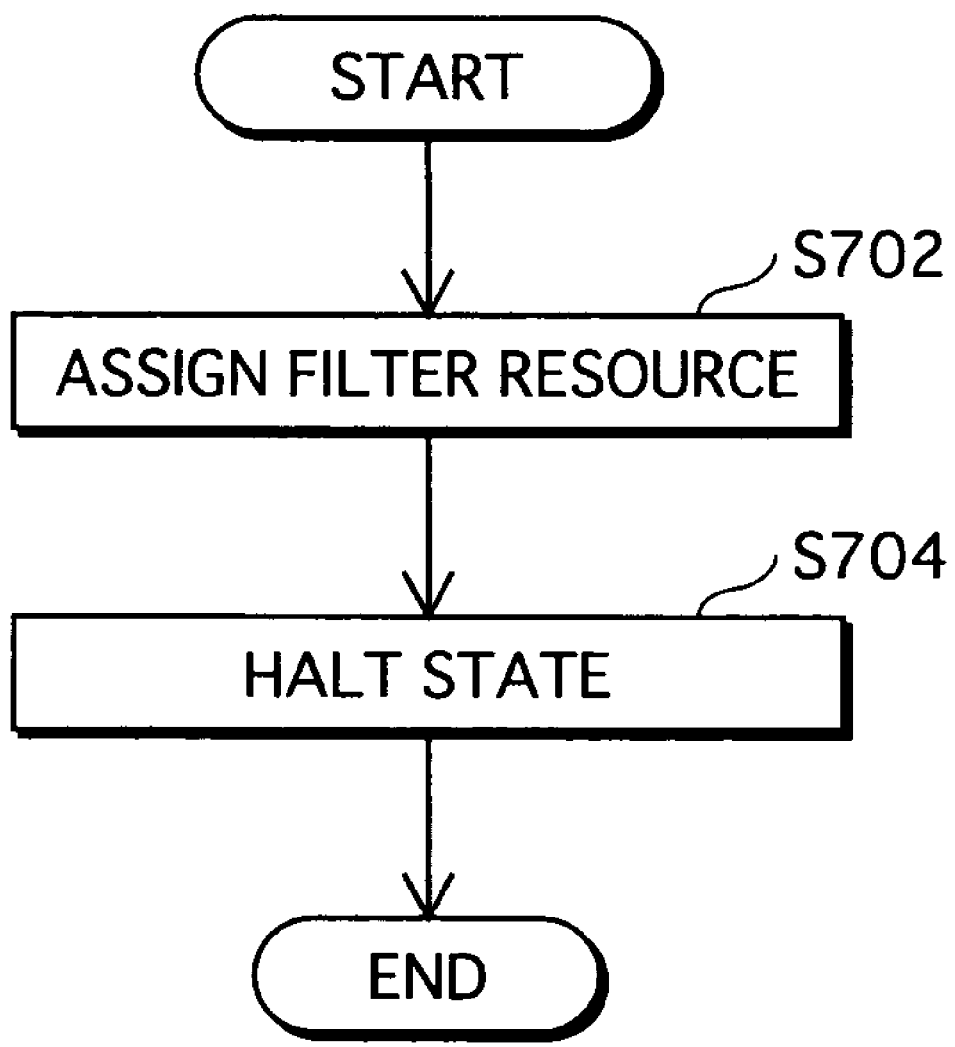
FIG. 7 is a flow chart that describes the operation of the ATT monitoring unit of the first embodiment.
Figure 8:
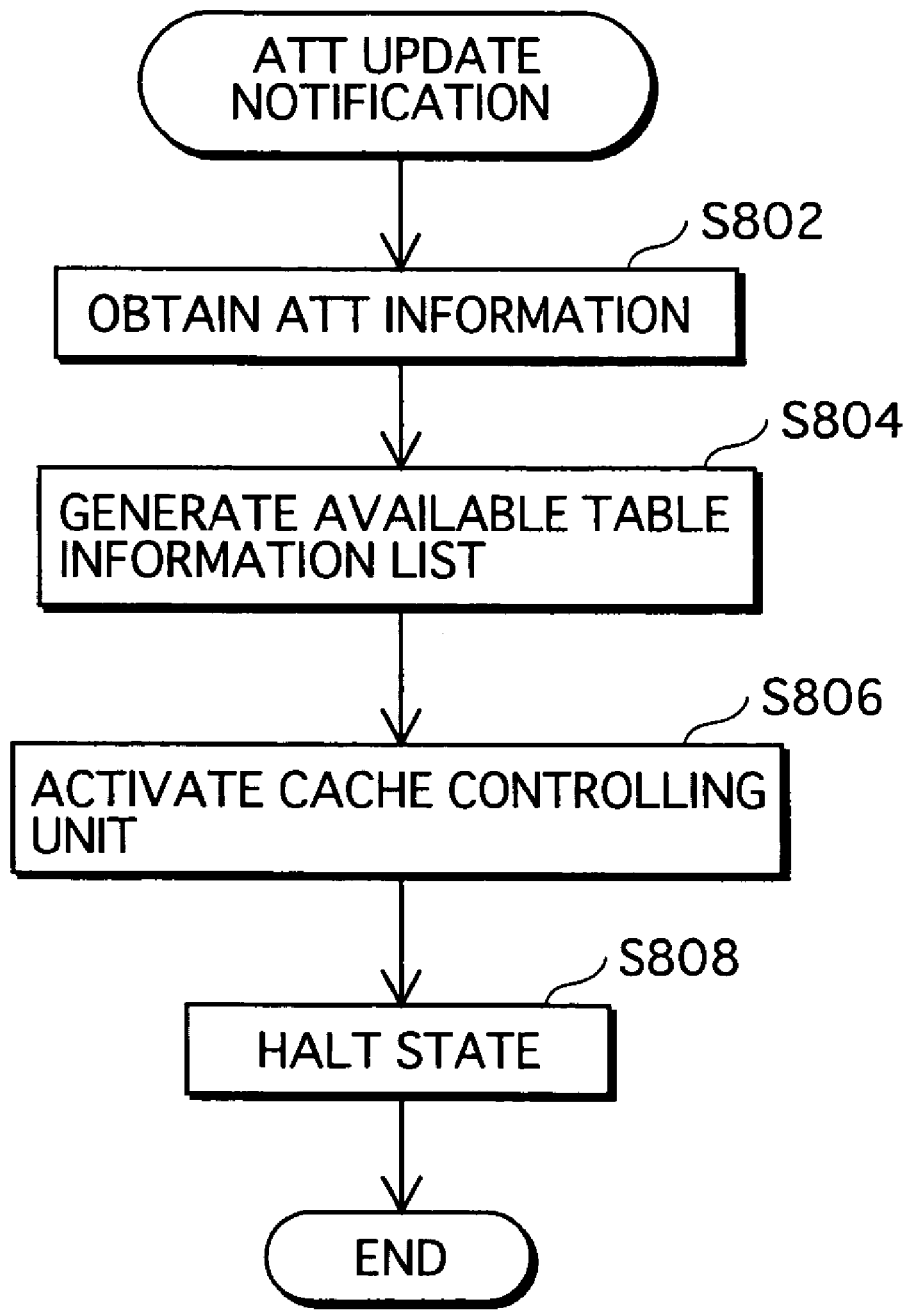
FIG. 8 is a flow chart that describes the operation of the ATT monitoring unit of the first embodiment.

Next, the operation of the ATT monitoring unit 128 will be explained, with reference to the flow charts in FIGS. 7 and 8.

It should be noted that the ATT monitoring unit 128 is also achieved by the CPU 126 operating according to the control software 127.

After being activated by the cache controlling unit 129, the ATT monitoring unit 128 sets the PID "0x30" of the ATT at the PID filter 133, and sets the value of the table_id and an updated value of the version number of the ATT, which has already been stored into the memory 131, at the section filter 134 (S702), and enters the halt state (S704).

When the time "t1" comes, the ATT monitoring unit 128 obtains the ATT' whose version number has been updated from the transport stream 301, and overwrites the ATT stored in the memory 131 with the ATT' (S802). Then, the ATT monitoring unit 128 generates an available table information list that includes the information of the tables, using the ATT' (S804), activates a task of the cache controlling unit 129 (S808), and enters the halt state (S808).

The available table information generated by the ATT monitoring unit 128 is shown in FIG. 9. The available table information list 901 shows the information of such tables that are to be updated, that newly start being multiplexed onto the transport stream 301, and that stop being multiplexed onto the transport stream 301, at the time "t1"

Figure 10:
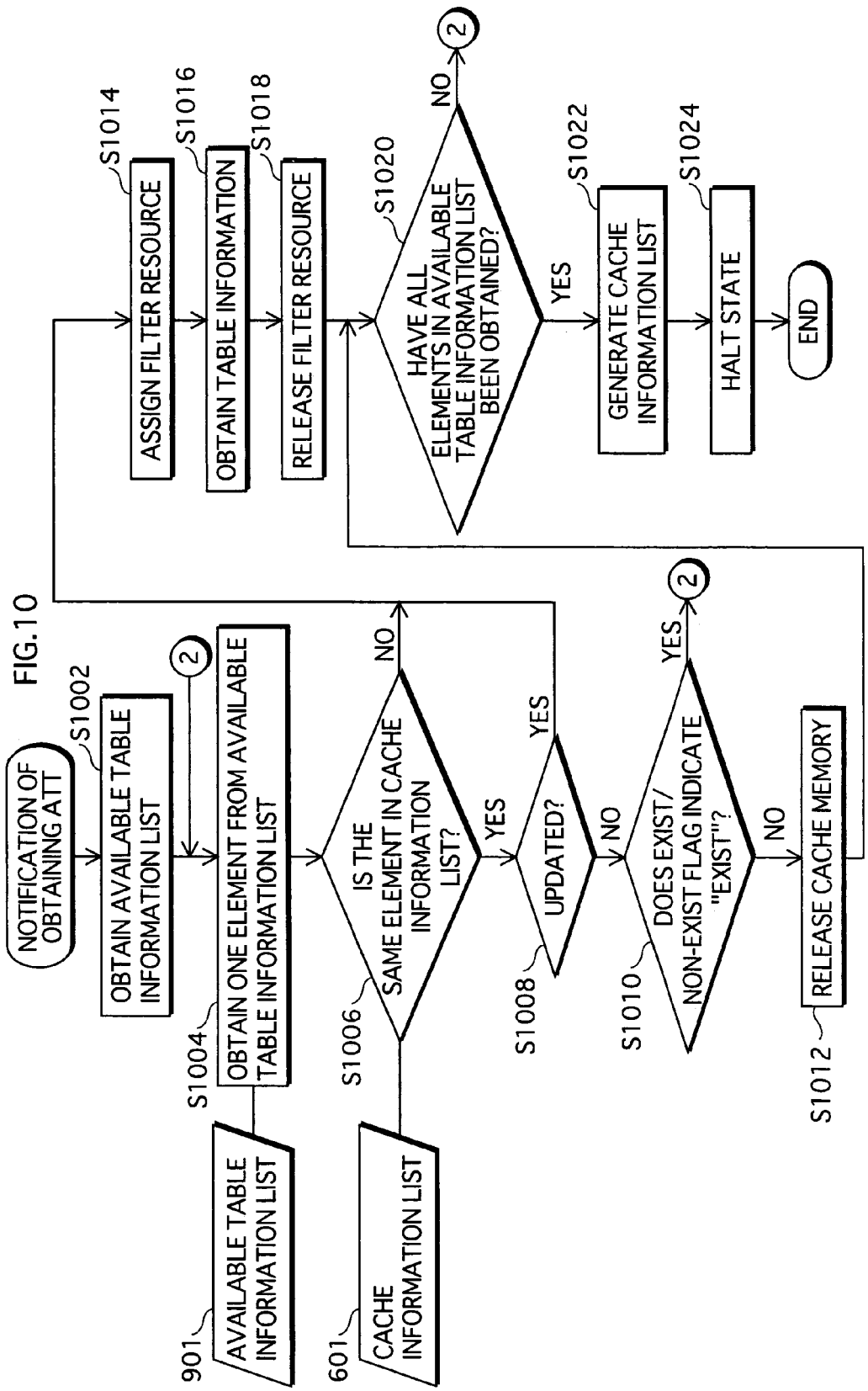
FIG. 10 is a flow chart that describes the operation of the cache controlling unit in the first embodiment.

The following again explains the operation of the cache controlling unit 129, with reference to the flow chart in FIG. 10.

Referring to FIG. 10, after being activated by the ATT monitoring unit 128, the cache controlling unit 129 obtains the available table information list 901 generated by the ATT monitoring unit 128 (S1002).

The cache controlling unit 129 obtains one element, that is information of one table, from the available table information list 901 (S1004), and judges if the same element is included in the cache information list 601 that has been generated, by comparing the identification information (S1006). When the same element is not included, the procedure advances to S1014. When the same element is included, the cache controlling unit 129 compares the version numbers and judges whether the elements have been updated to a higher version (S1008).

When the values of the version numbers are different from each other, it is judged that one of those elements has been updated to a higher version, and the procedure advances to S1014. When neither of those elements have been updated to a higher version, it is judged whether the exist/non-exist flag indicates "exist" or not (S1010). When it indicates "exist", the procedure returns to S1004. When it indicates "non", it means that the table has stopped being multiplexed onto the transport stream 301, and such a table is therefore deleted from the memory 131 (S1012).

PMT(3) and SDT(3) in the available table information list 901 are such tables. Through this process, it is possible to effectively utilize the storage area of the memory 131.

In S1014, the cache controlling unit 129 sets the PID and the table_id of such a table that has been judged in S1006 as a new table, at the PID filter 133 and the section filter 134, respectively. Thus, the cache controlling unit 129 obtains a table that has been newly multiplexed onto the transport stream 301 and stores the table into the memory 131 (S1016). SDT(4) in the available table information list 901 is such a table.

In S1014, the cache controlling unit 129 sets the PID and the table_id of such a table that has been judged in S1008 as being updated to a higher version, at the PID filter 133 and the section filter 134, respectively. Thus, the cache controlling unit 129 obtains a table that has been updated to a higher version and overwrites the table stored in the memory 131 with the updated table. The PAT and EIT (3) in the available table information list 901 are each such a table.

The cache controlling unit 129 releases the filter resource (S1018), judges whether or not all the elements in the available table information list have been obtained (S1020). When it is judged in the negative, the procedure returns to S1004. When it is judged in the affirmative, the cache controlling unit 129 generates a cache information list that corresponds to the updated tables in the memory 131 (S1022), activates the ATT monitoring unit 128, and enters the halt state (S1024).

It should be noted that, in the present embodiment, the cache controlling unit 129 obtains the tables according to the flow chart shown in FIG. 4. However, as long as the PAT is obtained prior to the PMTs, the order in which the other tables are obtained does not matter.

Additionally, the PID value of the ATT is arranged to be "0x30". However, it is acceptable to assign another packet identifier besides this.

In the present embodiment, the description is provided so that the PID filter 133 and the section filter 134 are realized as a set. However, it is also acceptable to provide two sets of a PID filter 133 and a section filter 134 so that one set is for the tables and the other set is for the ATT. With this arrangement, it is possible to respond to the updates occurring in the tables in a prompt manner.

As additional information, in a conventional case where it is not possible to obtain the ATT, unlike the present embodiment, it is necessary to provide six PID filters and eleven section filters in order to regularly await updates of the tables to a higher version, the tables being shown in FIG. 3, except the ATT.

Second Embodiment

The following explains the second embodiment of the digital broadcast apparatus and the digital broadcast receiving apparatus of the present invention.

The structure of the present embodiment is shown in FIG. 1. In addition to the structure of the first embodiment, the digital broadcast receiving apparatus 121 further comprises the cache schedule managing unit 130 to be realized by the CPU 126 operating according to the control software 127 and the timer 132.

In the first embodiment, when a table such as a PAT has been updated, the version number of the ATT is updated to a higher version. However, in the present embodiment, it is arranged so that the frequency of updating the ATT becomes lower, with the use of validity periods which are written in the ATT as information of the tables. More specifically, it is arranged so that, when a table newly starts being multiplexed onto a transport stream or stops being multiplexed onto a stream, the version of the ATT is not updated.

Figure 11:
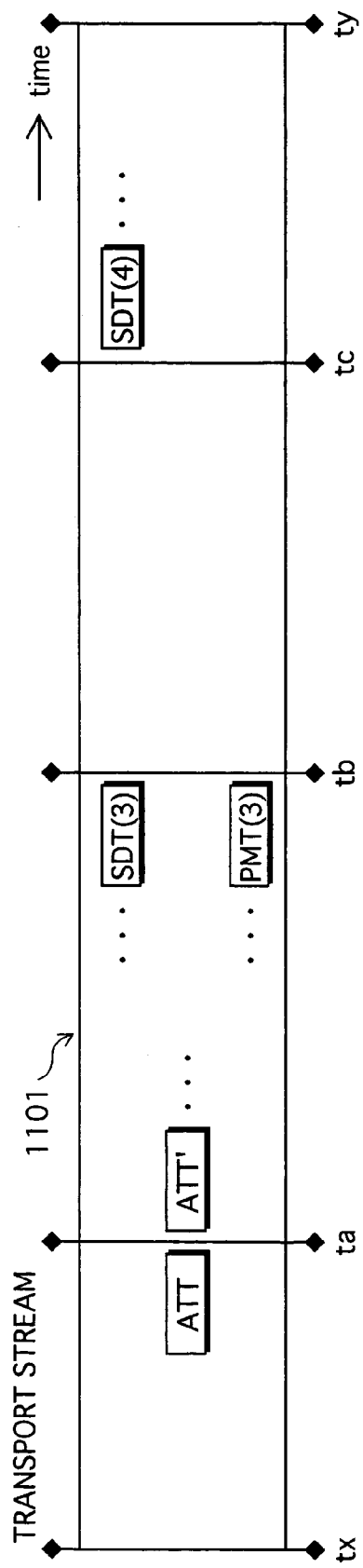
FIG. 11 is a schematic drawing of a transport stream that is transmitted in a second embodiment of the present invention of the digital broadcast apparatus and the digital broadcast receiving apparatus.

FIG. 11 is a schematic drawing of tables multiplexed onto a transport stream.

The left end of the transport stream 1101 is the time "tx" and the right end is the time "ty". At the time "ta", the ATT is updated. At the time "tb", both SDT(3) and PMT(3) stop being multiplexed onto the transport stream 1101. At the time "tc", SDT(4) newly starts being multiplexed onto the transport stream 1101.

The following explains the structure that is unique to the present embodiment.

FIG. 12 shows the information of the tables included in the ATT' which is updated to a higher version at the time "ta". PMT(3), SDT(3), and SDT(4) each have a validity period written.

Figure 13:
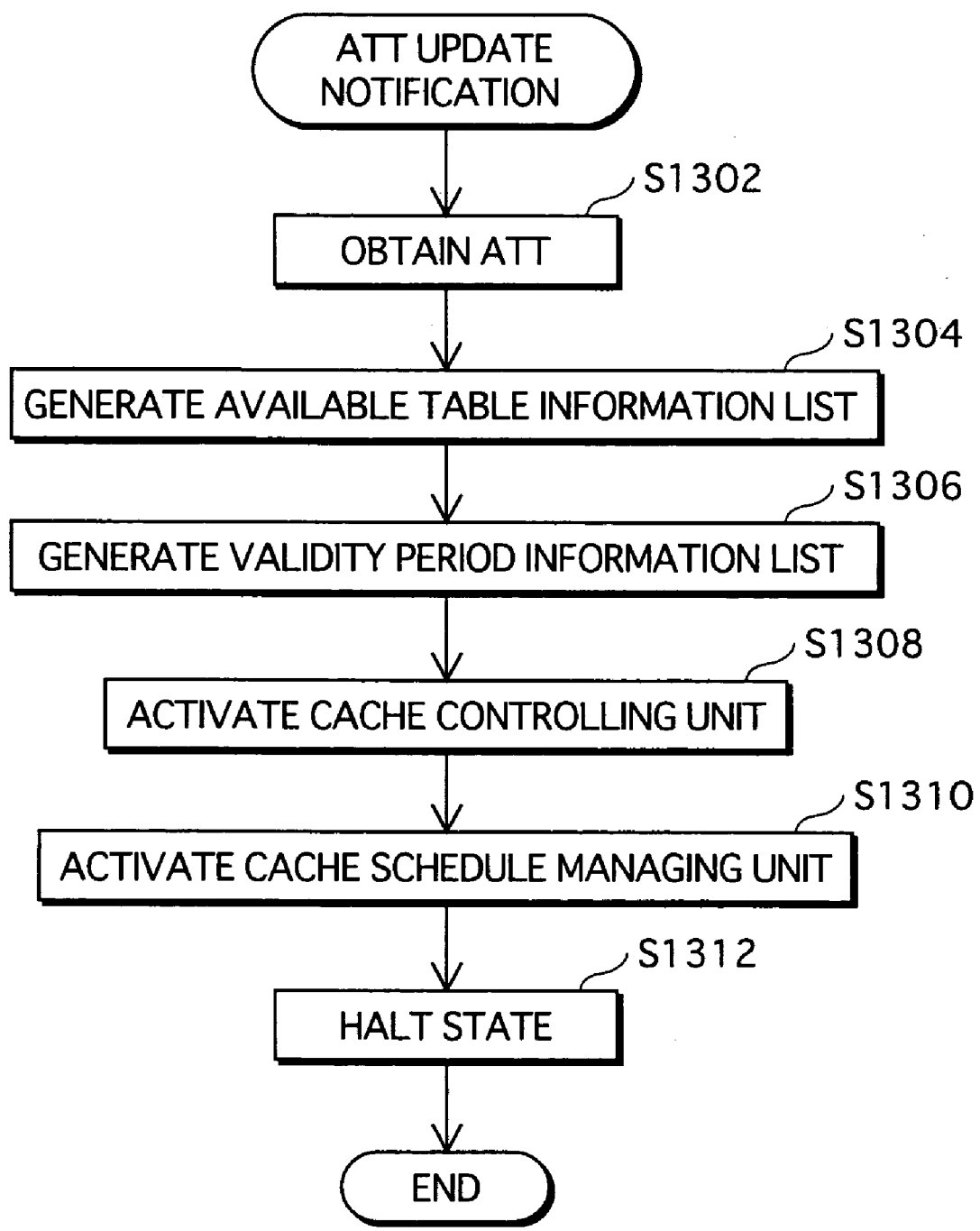
FIG. 13 is a flow chart that describes the operation of the ATT monitoring unit in the second embodiment.

The operation of the ATT monitoring unit 128 will be explained, with reference to the flow chart in FIG. 13.

The ATT monitoring unit 128 obtains the ATT' 1201, which has been separated and extracted by the TS decoder 124 and has been updated to a higher version (S1302). The ATT monitoring unit 128 then analyzes what is included in the obtained ATT' 1201 and generates an available table information list excluding such a table whose exist/non-exist flag shows "non" (S1304).

FIG. 14 shows an available table information list. SDT (4), which is written in the ATT' 1201, is excluded from the available table information list 1401. The available table information list 1401 shows a list of such tables that are being multiplexed onto the transport stream 1101 at the time "ta".

Then, the ATT monitoring unit 128 obtains such a table whose validity period is a value other than "−1", which is an invalid value, by referring to the information included in the ATT' 1201, so as to generate a validity period information list (S1306). After generating the validity period information list, the ATT monitoring unit 128 activates the cache controlling unit 129 (S1308), activates the cache schedule managing unit 130 (S1310), and enters the halt state (S1312).

FIG. 15 is the validity period information list generated by the ATT monitoring unit 128. The validity period information list 1501 is a list of such tables that have a validity period. The validity periods each show a beginning time and an ending time. For example, as for PMT(3), the time "tx" is the beginning time and the time "tb" is the ending time.

Figure 16:
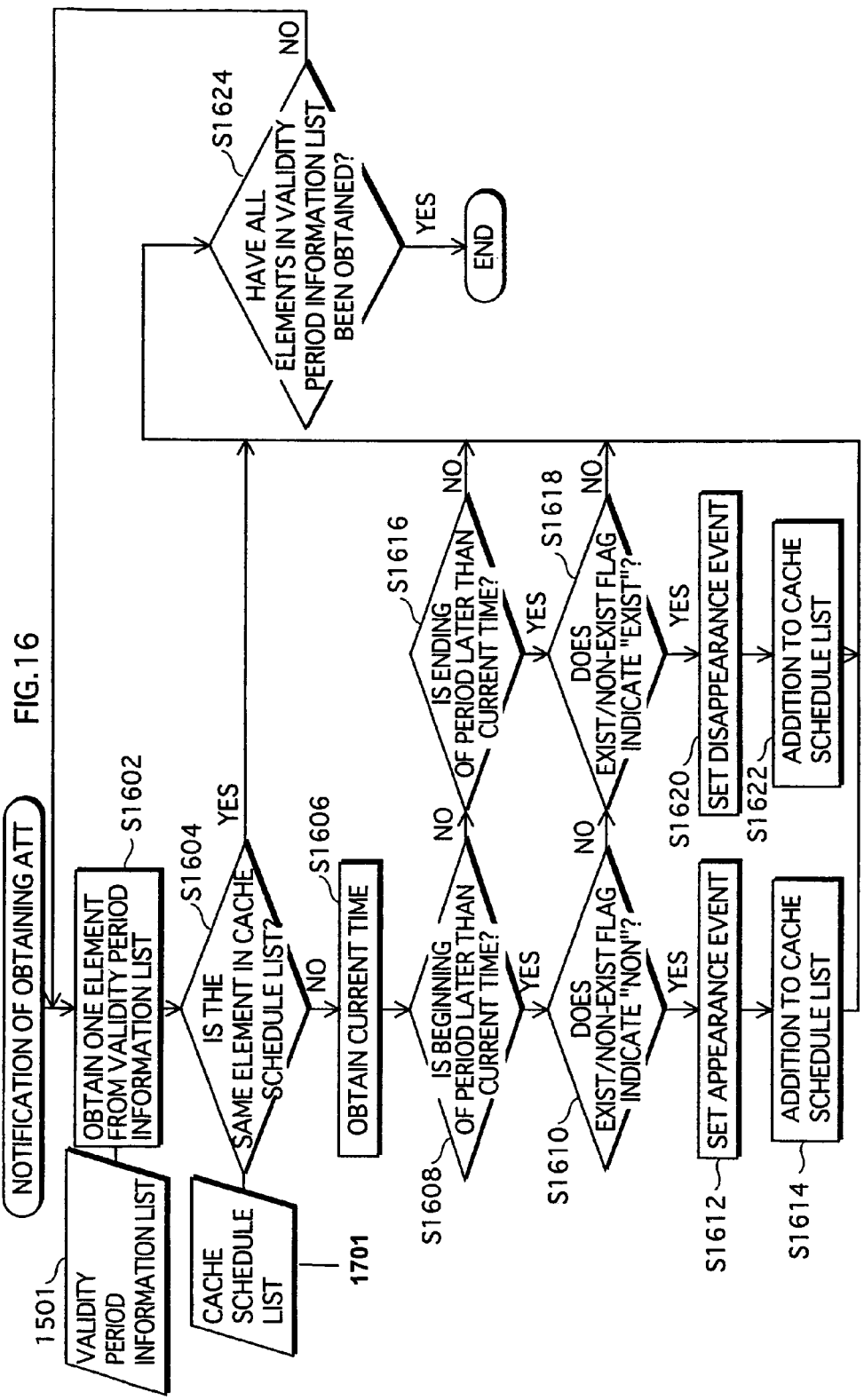
FIG. 16 is a flow chart that describes the operation of the cache schedule managing unit in the second embodiment.

The following describes the operation of the cache schedule managing unit 130 to be realized by the CPU 126 operating according to the control software 127, with reference to the flow chart in FIG. 16.

After being activated by the ATT monitoring unit 128, the cache schedule managing unit 130 obtains one element, that is information of one table, from the validity period information list 1501 (S1602), and judges if an element having the same identification information is already included in the cache schedule list generated by itself (S1604). When such an element is included, the procedure advances to S1624. When such an element is not included, since it is necessary to generate a new event, the cache schedule managing unit 130 obtains the current time from the timer 132 (S1606), and judges if the beginning time of the validity period is later than the current time or not (S1608). When it is judged in the negative, the procedure advances to S1616. When it is judged in the affirmative, it is further judged whether the exist/non-exist flag indicates "non" (S1610). When it is judged in the negative, the procedure advances to S1618. When it is judged in the affirmative, an appearance event is set at the timer 132 (S1612). Then, this appearance event is additionally recorded on the cache schedule list (S1614), and the procedure advances to S1624. Thus, the appearance event of SDT(4) has been recorded to the cache schedule list.

When it is judged in S1608 that the beginning of the validity period is before the current time, the cache schedule managing unit 130 judges whether or not the ending of the validity period is later than the current time (S1616). When it is judged that it is later, the cache schedule managing unit 130 further judges whether or not the exist/non-exist flag indicates "exist" (S1618). When it indicates "exist", a disappearance event is set at the timer 132 (S1620), a disappearance event is recorded in the cache schedule list (S1622), and the procedure advances to S1624. Through this processing in S1616 through S1622, the appearance events of PMT (3) and SDT (3) have been recorded in the cache schedule list.

As additional information, it is also acceptable to omit the judgment of the exist/non-exist flag in S1610 and S1618.

Then, the cache schedule managing unit 130 judges whether all the elements in the validity period information list 1501 have been obtained or not (S1624). When it is judged in the negative, the procedure returns to S1602. When it is judged in the affirmative, the processing is finished.

The cache schedule list generated by the cache schedule managing unit 130 is shown in FIG. 17.

The cache schedule list 1701 shows event occurrence times 1702, types of events 1703, and identification information 1704. The events written in the cache schedule list are set at the timer 132.

The timer 132 keeps time, and when an event occurrence time being set has come, the timer notifies the cache controlling unit 129 of the event.

In addition to the arrangements of the first embodiment, the cache controlling unit 129 further has the arrangements as described below.

Figure 18:
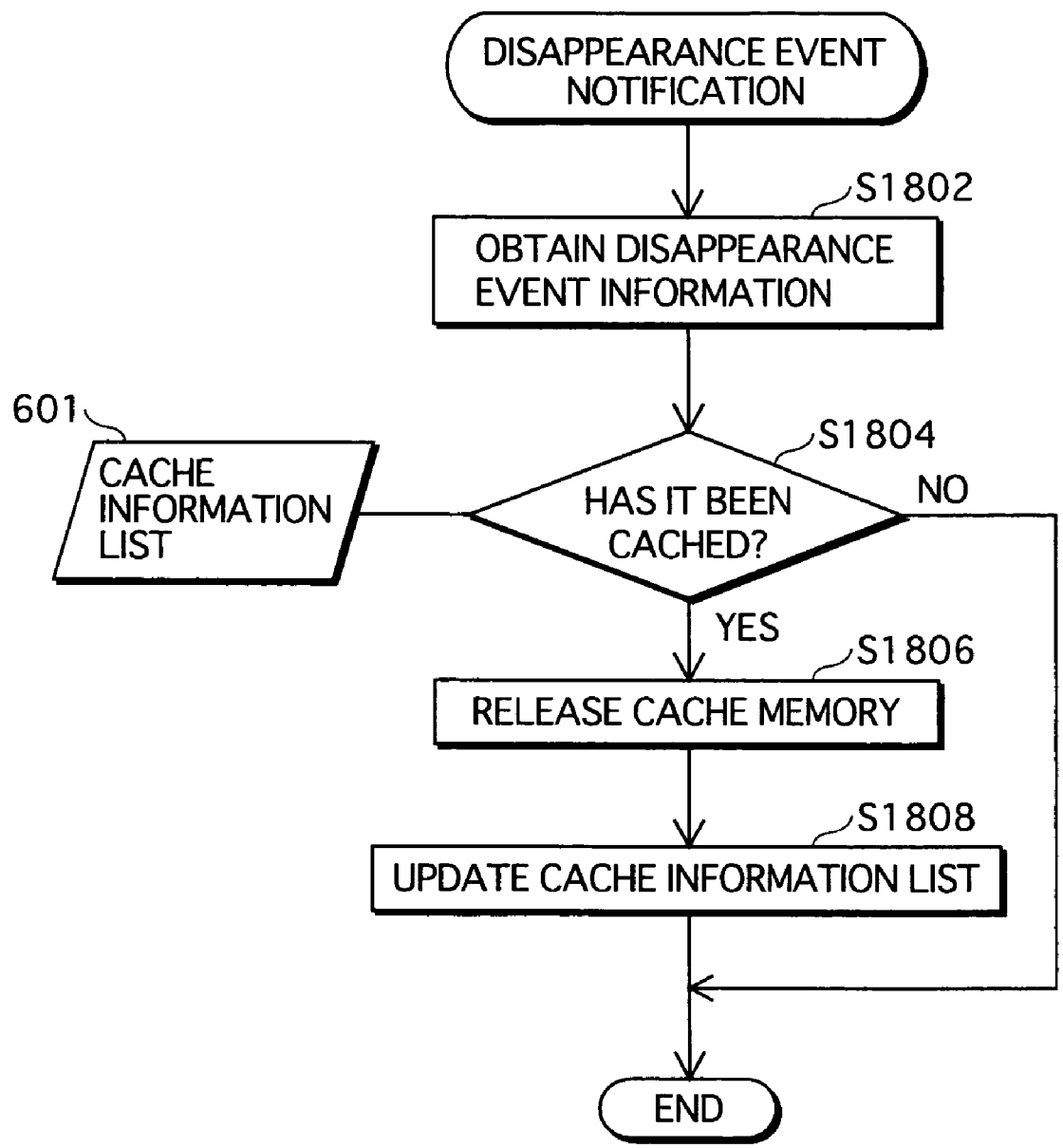
FIG. 18 is a flow chart that describes the operation of the cache controlling unit for a disappearance event, in the second embodiment.
Figure 19:
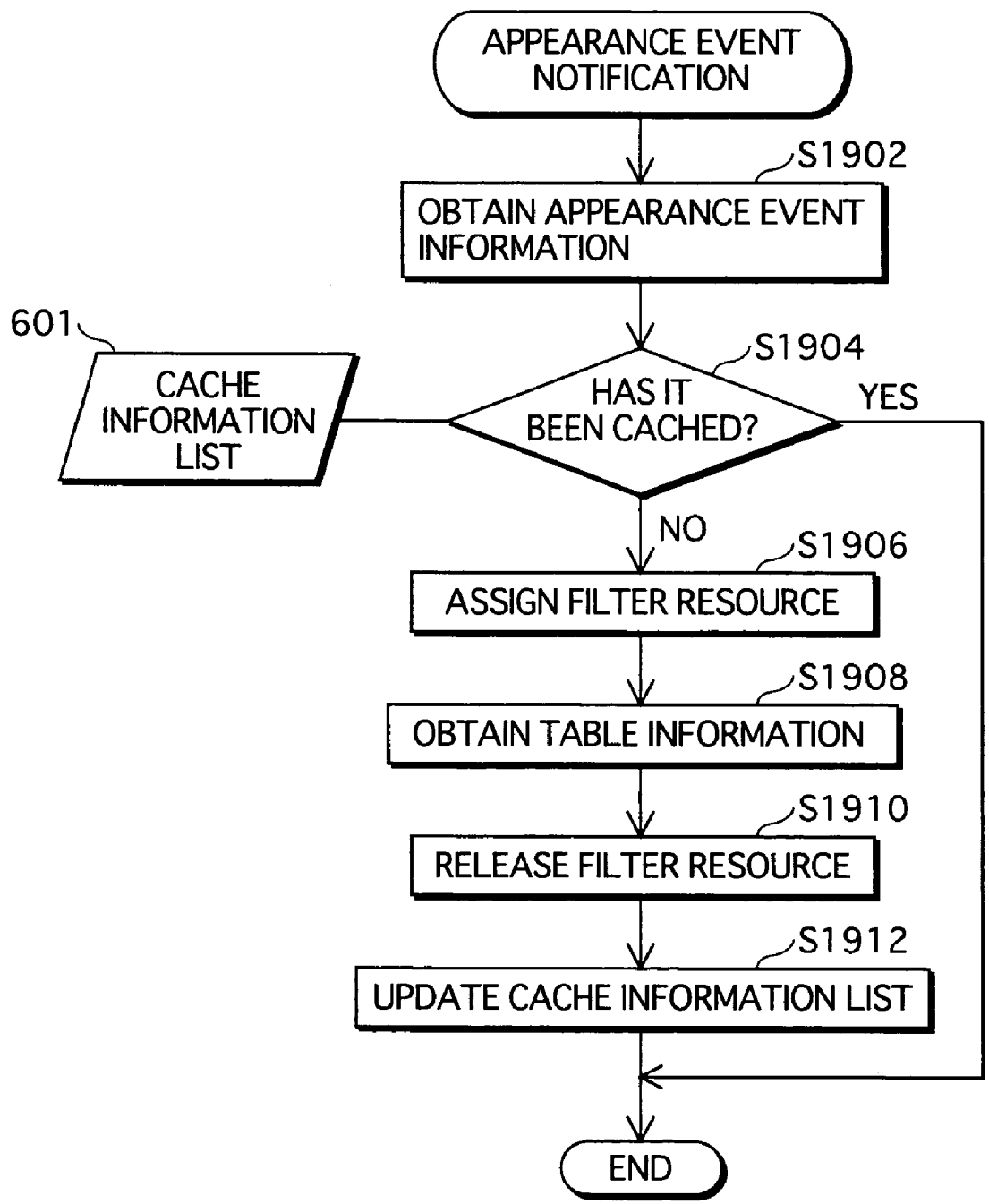
FIG. 19 is a flow chart that describes the operation of the cache controlling unit for an appearance event, in the second embodiment.

The operation of the cache controlling unit 129 will be explained in terms of disappearance event occurrence and appearance event occurrence, with reference to the flow charts in FIG. 18 and FIG. 19. It should be noted that it is the same arrangement as in the first embodiment that the cache controlling unit 129 is achieved by the CPU 126 operating according to the control software 127.

The cache controlling unit 129 is activated by the timer 132 when a disappearance event occurrence time has come, and obtains identification information of the disappearance event from the cache schedule list 1701 generated by the cache schedule managing unit 130 (S1802). The cache controlling unit 129 then judges whether or not the same identification information is included in the cache information list 601 that has been generated by itself (see FIG. 6) (S1804). When it is judged in the negative, the processing is finished. When it is judged in the affirmative, the cache controlling unit 129 deletes the particular table stored in the memory 131 (S1806), and deletes the information of the particular table from the cache information list 601 so as to update the list (S1808), and the processing is finished.

In other words, the disappearance event represents such a table that stops being multiplexed into the transport stream

1101. Therefore, the table is deleted because it is no longer necessary to have such a table stored in the memory 131.

Next, the cache controlling unit 129 is activated by the timer 132 when an appearance event occurrence time has come, and obtains the identification information of the appearance event from the cache schedule list 1701 generated by the cache schedule managing unit 130 (S1902). The cache controlling unit 129 then judges whether or not the same identification information is included in the cache information list 601 (S1904). When it is judged in the affirmative, the processing is finished. When it is judged in the negative, the PID of that particular table is set at the PID filter 133 in the TS decoder 124, and the value of the table_id of that particular table is set at the section filter 134 (S1906). When that particular table is separated and extracted by the TS decoder 124, the cache controlling unit 129 obtains the table, has it stored in the memory 131 (S1908), and releases the filter resource (S1910). Then, the cache controlling unit 129 records the information of the table in the cache information list so as to update the list (S1912), and the processing is finished.

Thus, with the use of the validity periods in the ATT 201, it is no longer necessary to update the ATT 201 to a higher version every time there is such a table that has stopped being multiplexed onto the transport stream 1101 or has newly started being multiplexed onto the transport stream 1101.

It should be noted that, in the present embodiment, there is an arrangement wherein the beginning and ending times of the multiplexing of a table onto the transport stream 1101 are written as a validity period so that the update of the ATT 201 can be dispensed with. However, by having a further arrangement wherein a time at which a table should be updated to a higher version is also written as a validity period in order to have an event occur, it is possible to further reduce the frequency of updating the ATT 201.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A digital broadcast receiving apparatus for receiving a transport stream into which a plurality of output information tables and an update information table are respectively and repeatedly multiplexed and into which video data and/or audio data are multiplexed and outputting the video data and/or the audio data, wherein each output information table is contained in a transport stream packet in a section format and includes (i) a first version number, (ii) a unique ID including a packet identifier and a table identifier, and (iii) information for extracting and outputting the video data and/or the audio data, wherein the update information table includes (i) a plurality of unique IDs, each of which identifies a respective output information table, (ii) a plurality of first version numbers, each of which indicates an update version of a respective output information table, and (iii) a second version number indicating a version of the update information table, and wherein the second version number of the update information table of the transport stream is updated when a change occurs in any of the unique IDs and the first version numbers included in the update information table, the digital broadcast receiving apparatus comprising:

a first extracting unit including corresponding packet and section filters, and operable to extract the output information tables from the transport stream according to the corresponding packet and section filters;

a storing unit operable to store the output information tables extracted by the first extracting unit;

a second extracting unit operable to extract the update information table from the transport stream when the second version number has been updated; and a controlling unit operable to control (i) the first extracting unit to extract an updated version of an output information table and (ii) the storing unit to update the output information tables stored therein according to the extracted updated version of the output information table, wherein the controlling unit comprises:

an information list generating subunit operable to generate an information list containing information that is included in each stored output information table and corresponds to information included in the extracted update information table;

a comparing subunit operable to (i) compare, with respect to each stored output information table, a corresponding first version number included in the information list with a corresponding first version number of the respective output information table included in the extracted update information table, and (ii) identify, based on the comparison, a stored output information table having a corresponding first version number that has been updated in the extracted update information table; and a filter condition setting subunit operable to set the packet identifier and the table identifier, included in the unique ID of the output information table identified by the comparing subunit, as the corresponding packet and section filters, respectively, to allow the first extraction unit to extract, from the transport stream, an updated version of the output information table identified by the comparing subunit, wherein the update information table further includes a flag indicating whether or not each of the output information tables is being multiplexed into the transport stream, and wherein the controlling unit further includes a deletion subunit operable to delete, from (i) the storing unit, an output information table indicated by the flag as not being multiplexed into the transport stream and (ii) the generated information list, any information corresponding to the deleted output information table.

2. The digital broadcast receiving apparatus of claim 1, wherein the unique IDs included in the update information table are the packet identifiers and the table identifiers.

3. The digital broadcast receiving apparatus of claim 1, wherein:

extraction conditions of the corresponding packet and section filters are set by the filter condition setting subunit; and when the first extracting unit extracts an updated version of an output information table, and the storing unit contains an older version of the output information table, the first extracting unit overwrites the older version of the output information table with the extracted updated version of the output information table.

4. The digital broadcast receiving apparatus of claim 1, wherein:

the update information table further includes a respective validity period of each output information table;

the controlling unit further comprises a schedule generating subunit operable to generate a schedule for extracting an output information table at a beginning of a respective validity period and for deleting an output information table at an end of a respective validity period; and the filter condition setting subunit and the deletion subunit operate according to the schedule.

5. A digital broadcast receiving method for receiving a transport stream into which a plurality of output information tables and an update information table are respectively and repeatedly multiplexed and into which video data and/or audio data are multiplexed and outputting video data and/or audio data, wherein each output information table is contained in a transport stream packet in a section format and includes (i) a first version number, (ii) a unique ID including a packet identifier and a table identifier, and (iii) information for extracting and outputting the video data and/or the audio data, wherein the update information table includes (i) a plurality of unique IDs, each of which identifies a respective output information table, (ii) a plurality of first version numbers, each of which indicates an update version of a respective output information table, and (iii) a second version number indicating a version of the update information table, and wherein the second version number of the update information table of the transport stream is updated when a change occurs in any of the unique IDs and the first version numbers included in the update information table, the digital broadcast receiving method comprising:

extracting the output information tables from the transport stream according to corresponding packet and section filters;

storing the output information tables extracted by the extracting of the output information tables;

extracting the update information table from the transport stream when the second version number has been updated; and controlling (i) the extracting of the output information tables to extract an updated version of an output information table and (ii) the storing of the output information tables to update the stored output information tables according to the extracted updated version of the output information table, wherein, the controlling further comprises:

generating an information list containing information that is included in each stored output information table and corresponds to information included in the extracted update information table;

comparing, with respect to each stored output information table, a corresponding first version number included in the information list with a corresponding first version number of the respective output information table included in the extracted update information table;

identifying, based on the comparing, a stored output information table having a corresponding first version number that has been updated in the extracted update information table; and respectively setting the packet identifier and the table identifier, included in the unique ID of the output information table identified by the identifying of the stored output information table, as the corresponding packet and section filters according to which the extracting of the output information tables extracts the output information tables to allow the extracting of the output information tables to extract, from the transport stream, an updated version of the output information table identified by the identifying of the stored output information table, wherein the update information table further includes a flag indicating whether or not each of the output information tables is being multiplexed into the transport stream, and wherein the controlling further includes deleting (i) a stored output information table indicated by the flag as not being multiplexed into the transport stream and (ii) from the generated information list, any information corresponding to the deleted output information table.

6. A computer-readable storage medium having a digital broadcast receiving program stored thereon, the digital broadcast receiving program for receiving a transport stream into which a plurality of output information tables and an update information table are respectively and repeatedly multiplexed and into which video data and/or audio data are multiplexed and outputting video data and/or audio data, wherein each output information table is contained in a transport stream packet in a section format and includes (i) a first version number, (ii) a unique ID including a packet identifier and a table identifier, and (iii) information for extracting and outputting the video data and/or the audio data, wherein the update information table includes (i) a plurality of unique IDs, each of which identifies a respective output information table, (ii) a plurality of first version numbers, each of which indicates an update version of a respective output information table, and (iii) a second version number indicating a version of the update information table, and wherein the second version number of the update information table of the transport stream is updated when a change occurs in any of the unique IDs and the first version numbers included in the update information table, the digital broadcast receiving program causing a computer to execute a method comprising:

extracting the output information tables from the transport stream according to corresponding packet and section filters;

storing the output information tables extracted by the extracting of the output information tables;

extracting the update information table from the transport stream when the second version number has been updated; and controlling (i) the extracting of the output information tables to extract an updated version of an output information table and (ii) the storing of the output information tables to update the stored output information tables according to the extracted updated version of the output information table, wherein, the controlling further comprises:

generating an information list containing information that is included in each stored output information table and corresponds to information included in the extracted update information table;

comparing, with respect to each stored output information table, a corresponding first version number included in the information list with a corresponding first version number of the respective output information table included in the extracted update information table;

identifying, based on the comparing, a stored output information table having a corresponding first version number that has been updated in the extracted update information table; and respectively setting the packet identifier and the table identifier, included in the unique ID of the output information table identified by the identifying of the stored output information table, as the corresponding packet and section filters according to which the extracting of the output information tables extracts the output information tables to allow the extracting of the output information tables to extract, from the transport stream, an updated version of the output information table identified by the identifying of the stored output information table, wherein the update information table further includes a flag indicating whether or not each of the output information tables is being multiplexed into the transport stream, and wherein the controlling further includes deleting (i) a stored output information table indicated by the flag as not being multiplexed into the transport stream and (ii) from the generated information list, any information corresponding to the deleted output information table.

* * * * *